US006842522B1

(12) United States Patent
Downing

(10) Patent No.: US 6,842,522 B1
(45) Date of Patent: Jan. 11, 2005

(54) SECURE DIGITAL VIDEO DISK AND PLAYER

(75) Inventor: Daniel Downing, Montara, CA (US)

(73) Assignee: Macrovision Corporation, Sunnyvale, CA (US)

( * ) Notice: Subject to any disclaimer, the term of this patent is extended or adjusted under 35 U.S.C. 154(b) by 737 days.

(21) Appl. No.: 09/586,680

(22) Filed: Jun. 1, 2000

(51) Int. Cl.[7] ............................ H04N 7/167; G11B 7/24
(52) U.S. Cl. ........................ 380/210; 380/252; 380/287; 369/275.3; 369/59.26; 369/124.08
(58) Field of Search .......................... 380/210; 341/68, 341/69; 369/275.3, 59.26, 124.08

(56) References Cited

U.S. PATENT DOCUMENTS

| | | | |
|---|---|---|---|
| 5,499,224 A | | 3/1996 | Sanada |
| 5,661,848 A | | 8/1997 | Bonke et al. |
| 5,720,030 A | | 2/1998 | Kamihara et al. |
| 5,768,286 A | | 6/1998 | Hsu et al. |
| 5,848,037 A | * | 12/1998 | Iwasaki et al. .......... 369/47.22 |
| 6,128,257 A | | 10/2000 | Zhou et al. |
| 6,185,248 B1 | | 2/2001 | Wiegand |
| 6,233,715 B1 | | 5/2001 | Kuki et al. |
| 6,487,293 B2 | | 11/2002 | Sako et al. |
| 6,580,682 B1 | * | 6/2003 | Kamperman et al. .... 369/275.3 |

FOREIGN PATENT DOCUMENTS

| | | | | |
|---|---|---|---|---|
| EP | 418964 A1 | * | 3/1991 | ........... G11B/20/00 |
| EP | 0 418 964 | | 3/1991 | ........... G11B/20/00 |
| EP | 0 783 167 | | 7/1997 | ........... G11B/20/00 |
| EP | 783167 A1 | * | 7/1997 | ........... G11B/20/00 |
| EP | 079496 | | 9/1997 | |
| EP | 794496 A1 | * | 9/1997 | ........... G06F/12/14 |
| JP | 08153331 A | * | 6/1996 | ........... G11B/7/007 |
| JP | 08-153331 | | 11/1996 | |
| WO | WO 9803973 A2 | * | 1/1998 | ........... G11B/7/007 |
| WO | WO 98/03973 | | 1/1998 | ........... G11B/7/007 |
| WO | WO 9852114 A1 | * | 11/1998 | ............. G06F/1/00 |
| WO | WO 98/52114 | | 11/1998 | ............. G06F/1/00 |
| WO | WO 9852194 A1 | * | 11/1998 | ........... G11B/20/00 |
| WO | WO 98/52194 | | 11/1998 | ........... G11B/20/00 |
| WO | WO 00/68945 | | 11/2000 | |

OTHER PUBLICATIONS

ECMA Standardizing Information and Communication Systems: "Standard ECMA—130: Data interchange on read–only 120 mm optical data disks (CD–ROM)" Standard ECMA—130, XP002143627 Geneva, Switzerland.*
ECMA: Standardizing Information and Communication Systems: Standard ECMA–272, 2nd Edition: 120mm Rewritable Disk (DVD–RAm) Standard ECMA, XX,XX no 272 Jun. 1999 p. 1–115 XP002186767.

* cited by examiner

*Primary Examiner*—Ayaz Sheikh
*Assistant Examiner*—Brandon Hoffman
(74) *Attorney, Agent, or Firm*—Morrison & Foerster LLP

(57) ABSTRACT

A method for recoding data on an optical medium such as DVD. The method includes receiving main data from a data source, determining a plurality of data frame values in response to the main data, inverting at least one selected bit in at least one of the data frame values to generate a plurality of encoded data frames, scrambling the encoded data frames by a feedback shift register to generate scrambled data frames, generating ECC values in response to the scrambled data frames, adding the ECC values to the scrambled data frames to generate an ECC block, rearranging the ECC block to generate a plurality of recording frames, encoding the recording frame by an eight-to-sixteen modulation (ESM) encoder to generate code words, adding sync values to the code words to generate a plurality of physical sectors, and recording the physical sectors on the optical medium. There is a complementary method for reading and decoding data from an optical medium.

19 Claims, 4 Drawing Sheets

US 6,842,522 B1

SECURE DIGITAL VIDEO DISK AND PLAYER

TECHNICAL FIELD OF THE INVENTION

This invention relates to digital video disks and digital video disk players, specifically to a secure system involving proprietary digital video disk formats and associated compliant players to prevent copying and unauthorized use of digital video disk program material.

BACKGROUND OF THE INVENTION

There are several related standards for DVDs published by the ECMA organization that are in common use today. These standards include ECMA-267 ($2^{nd}$ Ed., December 1999), entitled "120 mm DVD—Read-Only Disk," ECMA-268 (December 1997), entitled "80 mm DVD—Read-Only Disk," ECMA-272 ($2^{nd}$ Ed., June 1999), entitled "120 mm DVD Rewritable Disk (DVD-RAM)," and ECMA-274 (April 1998), entitled "Data Interchange on 120 mm Optical Disk Using +RW Format—Capacity: 3,0 Gbytes and 6,0 Gbytes," all of which are incorporated herein by reference in their entirety. Some of these standards have been adopted by the International Standards Organization as ISO/IEC standards.

Digital video disks are a digital storage media, unlike conventional videotape. Therefore copies of such digital material contain all of the information of the original and are a frequent target for pirates (copyright infringers) who make unauthorized copies or otherwise misuse same.

The present invention is directed to a particular aspect of the security problem of DVDs. Specifically, there is a need for a DVD player that only plays proprietary DVDs, does not play standard DVDs, where the proprietary DVDs cannot be copied and the proprietary DVDs do not play on standard DVD players. Thus this is a "closed" system involving proprietary format DVDs and associated players. (In this description, the term "DVD player" is used to refer to any DVD drive or playback system.)

Any such security system must be relatively inexpensive to implement (since these are consumer players), and must be robust so as to prevent copying, and not interfere with playing and enjoyment of the DVD program material. The cost requirement is especially restrictive since even a few dollars of added cost are problematic in consumer electronics. Therefore, well-known methods such as encryption may be problematic since they may require inclusion in the player of a dedicated decryption integrated circuit. Since the decryption must be performed in real time, software decryption is generally less useful in this context.

SUMMARY OF THE INVENTION

Therefore, a need has arisen for a DVD encoding and decoding system that addresses the disadvantages and deficiencies of the prior art. In particular, a need has arisen for a DVD encoding and decoding scheme which results in a proprietary DVD format.

In accordance with one aspect of the present invention, a method for recording data on an optical medium is disclosed. In one embodiment, the method includes receiving main data from a data source, determining a plurality of data frame values in response to the main data, inverting at least one selected bit in at least one of the data frame values to generate a plurality of encoded data frames, scrambling the encoded data frames by a feedback shift register to generate scrambled data frames, generating ECC values in response to the scrambled data frames, adding the ECC values to the scrambled data frames to generate an ECC block, rearranging the ECC block to generate a plurality of recording frames, encoding the recording frames by an eight-to-sixteen modulation (ESM) encoder to generate code words, adding sync values to the code words to generate a plurality of physical sectors, and recording the physical sectors on the optical medium.

In accordance with one aspect of the present invention method for reading and decoding data from an optical medium is disclosed. In one embodiment, the method includes reading channel bits from the optical medium, removing sync codes from the channel bits to derive a plurality of ESM-encoded words, decoding the ESM-encoded words by an ESM decoder to generate a plurality of recording frames, rearranging the recording frames to generate an ECC block, removing parity bytes from the ECC block to generate a plurality of scrambled data frames, descrambling the scrambled data frames to generate a plurality of encoded data frames, inverting at least one selected bit of each encoded data frame to generate a plurality of data frames, and extracting main data from the plurality of data frames.

These complementary encoding and decoding schemes provide a method for creating and reading proprietary format DVDs which may not be read or copied by conventional DVD players. The fact that these encoding and decoding schemes result from relatively minor modifications to existing DVD standards allows many standard system components to be used. The encoding/decoding schemes described herein are therefore relatively easy and inexpensive to implement.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiments of the present invention and their advantages are best understood by referring to FIGS. 1 through 7 of the drawings. Like numerals are used for like and corresponding parts of the various drawings.

Figure 1:
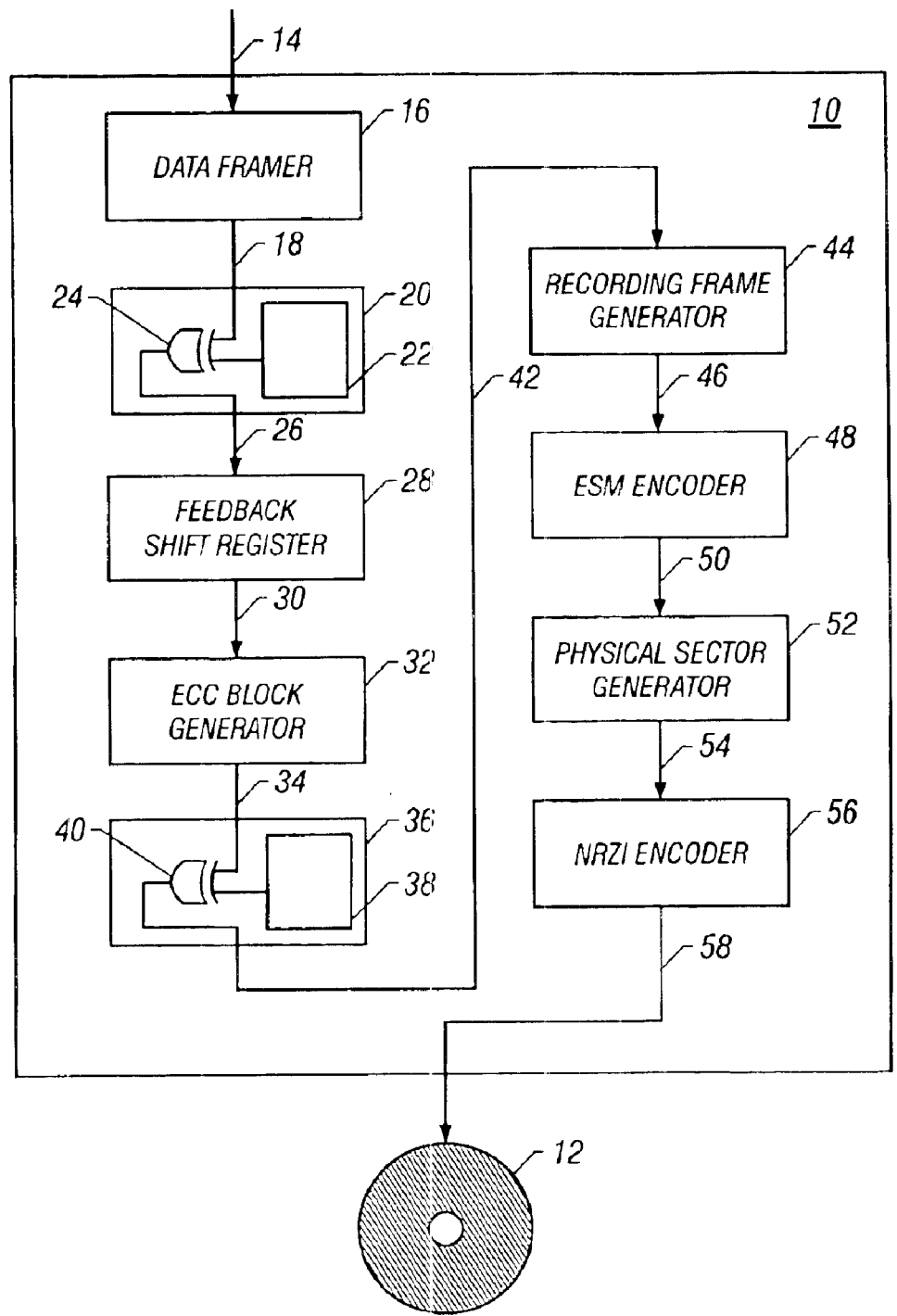
FIG. 1 is a partial block diagram of a DVD data encoding system.

Referring to FIG. 1, a partial block diagram of a DVD data encoding system 10 is shown. DVD data encoding system 10 is designed to encode data for recording on a DVD 12 using a proprietary format (described below) which may be derived from, for example, the ECMA-267 standard. For purposes of illustration, a proprietary DVD format derived by modification of primarily the ECMA-267 standard is described below. However, it will be understood that similar modifications may be made to ECMA-268, ECMA-272 or ECMA-272 to create corresponding proprietary DVD formats.

DVD data encoding system 10 receives data 14 from a host. In the terminology of ECMA-267, this data is referred to as Main Data. The successive transformation of the Main Data into data frames, scrambled frames, ECC blocks, recording frames and physical sectors proceeds as described in ECMA-267, but with certain modifications to create a proprietary DVD format. Since many of the data encoding steps (without modification) are described in detail in ECMA-267, some data encoding details which may be found in ECMA-267 are omitted from the following description.

Figure 2:
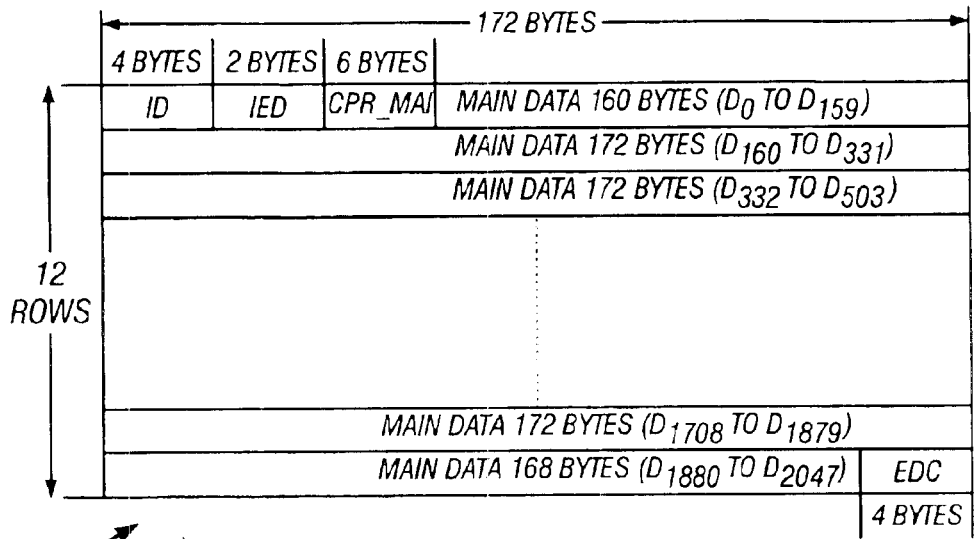
FIG. 2 is a diagram illustrating the content of a data frame.

The Main Data is received by a data framer 16, which puts the data into data frames 18 in the format described in ECMA-267. A data frame 18 consists of 2,064 bytes arranged in an array of 12 rows each containing 172 bytes, as shown in FIG. 2. Unless otherwise noted, the term "byte" as used herein refers to an eight-bit byte. The first row starts with three fields: the Identification Data (ID) field, the check bytes of the ID Error Detection Code (IED), and the Copyright Management Information field (CPR_MAI). These fields are followed by 160 bytes of Main Data in the first row. The next 10 rows each contain 172 Main Data bytes. The last row contains 168 Main Data bytes followed by four bytes for recording the check bits of an Error Detection Code (EDC). The 2,048 Main Data bytes are identified as $D_0$ through $D_{2047}$.

Figure 3:
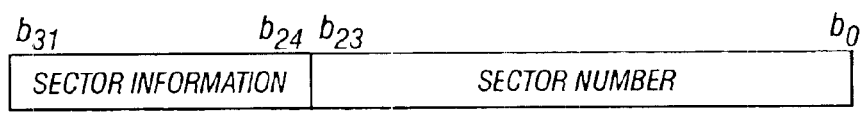
FIG. 3 is a diagram illustrating the content of a data frame ID field.

The ID field consists of four bytes, the bits of which are numbered consecutively from bo to $b_{31}$, as shown in FIG. 3. The least significant three bytes, bits $b_0$ to $b_{23}$, specify the sector number in binary notation. The sector number of the first sector of an ECC block of 16 sectors is a multiple of 16.

Figure 4:
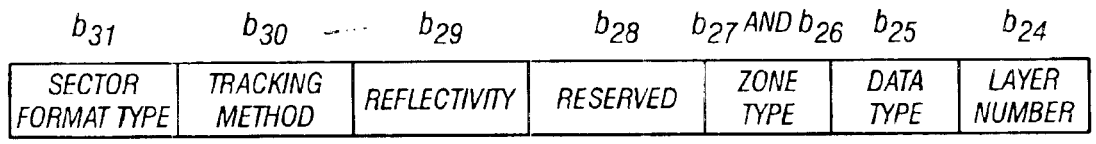
FIG. 4 is a diagram illustrating the content of a data frame Sector Information byte.

The most significant byte of the ID field is a Sector Information byte, illustrated in FIG. 4. The bits of this byte are used to indicate a layer number data type, zone type, reflectivity, tracking method and sector format type for the sector. The values of these bits are prescribed by ECMA-267, and any values other than the prescribed values are expressly prohibited by ECMA-267.

In accordance with one aspect of the present invention, the data frame 18 may be modified by a data frame encoding system 20 prior to the commencement of conventional data frame encoding as described in ECMA-267. In particular, data frame encoding system 20 may modify one or more of the values within the data frame 18 so as to prevent a standard DVD player from reading DVD 12.

In one embodiment, data frame encoding system 20 includes an encoder 22 and an exclusive-OR gate 24. Encoder 22 determines which bits of the data frame 18 are to be modified. When a data bit is to be left unmodified, encoder 22 provides a low logic level signal to XOR gate 24, thereby allowing the data bit to pass through XOR gate 24 unmodified. When a data bit is to be changed, encoder 22 provides a high logic level signal to XOR gate 24, thereby causing XOR gate 24 to invert the data bit at its output. Although data frame encoding system 20 is illustrated as a discrete functional block within DVD data encoding system 10, it will be understood that the functions of data frame encoding system 20 may easily be integrated into another functional block within DVD data encoding system 10, such as data framer 16.

Data frame encoding system 20 may make a variety of modifications to the data frame 18 to render DVD 12 unreadable by a conventional DVD player. In one such modification, the sector number within the ID field is altered to prevent effective navigation of DVD 12 by a conventional DVD player. To accomplish this, data frame encoding system 20 may XOR the 24-bit sector number of each data frame with a 24-bit encoding byte (e.g., 010101010101010101010101). Alternatively, simple inversion of every sector number bit may be sufficient (in effect, an encoding byte of 111111111111111111111111). In either case, the An alteration of the sector numbers will result in a conventional DVD player being unable to effectively navigate DVD 12, thereby preventing unauthorized copying and playback of the DVD program material.

Data frame encoding system 20 may also alter the various Sector Information values of the ID field. For example, the sector format type as described in the various ECMA standards mentioned above has a value of 0 (indicating constant linear velocity) for DVD-ROM, a value of 0 (indicating zoneless format) for DVD R/W, and a value of 1 (indicating zoned format) for DVD-RAM. Thus, an inversion of this value by data frame encoding system 20 will give invalid values for all types of DVDs in conventional DVD players.

As another example, the tracking method as described in the various ECMA standards mentioned above has a value of 0 (indicating pit tracking) for DVD-ROM and a value of 0 (indicating pit tracking in an embossed area) or 1 (indicating grooved tracking in a rewritable area) for DVD R/W and DVD-RAM. Thus, an inversion of this value by data frame encoding system 20 will produce an invalid value for DVD-ROM disks, an select the wrong type of tracking in a conventional DVD-R/W or DVD-RAM drive.

As another example, the reflectivity as described in the various ECMA standards mentioned above has a value of 0 (indicating reflectivity greater than or equal to 40%) or 1 (indicating a maximum reflectivity of 40%) for DVD-ROM and a value of 1 (indicating a maximum reflectivity of 40%) for DVD R/W and DVD-RAM. Thus, an inversion of this value by data frame encoding system 20 will produce an incorrect value for DVD-ROM disks and an invalid value for DVD-R/W or DVD-RAM disks.

As another example, the data type as described in the various ECMA standards mentioned above has a value of 0 (indicating read only) for DVD-ROM and a value of 0 (indicating embossed area) or 1 (indicating rewritable area) for DVD R/W and DVD-RAM. Thus, an inversion of this value by data frame encoding system 20 will produce an invalid value for DVD-ROM disks and an incorrect value for DVD-R/W or DVD-RAM disks.

As yet another example, the layer number as described in the various ECMA standards mentioned above has a value of 0 (indicating single layer or layer 0 of a dual layer) or 1 (indicating layer 1 of a dual layer) for DVD-ROM and a value of 0 for DVD R/W and DVD-RAM. Thus, an inversion of this value by data frame encoding system 20 will produce an incorrect value for DVD-ROM disks and an invalid value for DVD-R/W or DVD-RAM disks.

It will be understood that the phrases "incorrect value" and "invalid value" as used herein refer to values which are incorrect or invalid according to the various ECMA DVD standards. An incorrect or invalid value may cause a conventional DVD playback system to be unable to read the Main Data on DVD 12. However, a compliant DVD player designed in accordance with the present invention includes decoding a decoder which restores the various inverted data frame values to their original (valid) values during playback.

In addition to altering the ID field of a data frame 18, data frame encoding system 20 may also alter the IED and EDC fields of a data frame 18 after those fields have been conventionally calculated in accordance with ECMA-267. Data frame encoding system 20 may encode the IED field by simple inversion or by an XOR operation with a 16-bit encoding byte. The encoding of the IED field will cause a conventional DVD player to determine that the data in the ID field is incorrect. Similarly, the EDC field may be encoded by simple inversion or by an XOR operation with encoding bytes. The encoding of the EDC field will cause a conventional DVD player to determine that the Main Data in the data frame is incorrect. Either one of these encoding schemes may be sufficient to prevent playback of DVD 12 by a conventional DVD player.

As another alternative, data frame encoding system 20 may alter the data portion of data frames in selected areas of DVD 12. For example, the Lead-in Zone, and more specifically the Control Data Zone contained therein, includes physical format information such as disk category, version number, disk size, maximum transfer rate, disk structure, recording density, data zone allocation and a burst cutting area descriptor as described in ECMA-267. Simple inversion of this information by data frame encoding system 20 will effectively confuse a conventional DVD playback system when it attempts to interpret this data. The data portion of data frames in other parts of DVD 12 may also be inverted to prevent playback by a conventional DVD player.

As still another alternative, data frame encoding system 20 or data framer 16 may alter the overall structure of the data frame 14. For example, the order of the rows within the data frame 14 may be reversed.

Data frame encoding system 20 and/or data framer 16 may be programmed to implement any one or more of the many data frame alteration schemes described above. Many, if not all, of these schemes are sufficient by themselves to prevent playback of DVD 12 by a conventional DVD player.

Data frame encoding system 20 generates encoded data frames 26, which are provided to a feedback shift register 28. In accordance with ECMA-267, feedback shift register 28 scrambles the Main Data bytes of the encoded data frames 26 to generate scrambled frames 30. A description of the feedback shift register and the pre-set values used therefor may be found in ECMA-267, and will not be described further herein.

Figure 7:
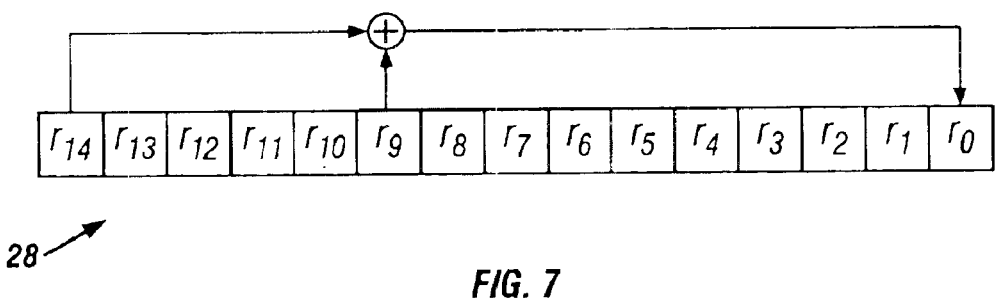
FIG. 7 is a block diagram of a feedback shift register.

In accordance with one aspect of the present invention, a proprietary DVD format may be created by using either a modified feedback shift register or modified pre-set values for feedback shift register 28, or both. For example, an alternative feedback shift register 28 for use in DVD data encoding system 10 is shown in FIG. 7. In feedback shift register 28, bit $r_0$ is combined with bit $r_{14}$ in an exclusive-OR operation to generate a new value for bit $r_0$. Thus, feedback shift register 28 uses a different polynomial than that specified by ECMA-267, thereby giving different scrambling results and preventing DVD 12 from being read by a conventional DVD player.

As another example, a modified set of pre-set values is presented in hexadecimal form in Table A. These pre-set values may be used in the same manner as the pre-set values set forth in ECMA-267, with either a conventional or modified feedback shift register 28. At the beginning of the scrambling procedure of a data frame, bit positions $r_{14}$ to $r_0$ of feedback shift register 28 are pre-set to one of the values specified in Table A. (The four-digit hexadecimal values of Table A may be converted to 15-bit binary values in a conventional manner for placement in the corresponding fifteen bit positions feedback shift register 28.) The initial pre-set number is equal to the value represented by bits $b_7$ to $b_4$ of the ID field of the data frame. The same pre-set value shall be used for 16 consecutive data frames. After 16 groups of 16 data frames, the sequence is repeated. The bits $r_7$ to $r_0$ are taken from feedback shift register 28 as a scrambling byte after each eight-bit shift. The eight-bit shift is repeated 2047 times to produce 2048 scrambling bytes which are exclusive-ORed with the Main Data bytes as described ECMA-267 to generate scrambled frames 30.

TABLE A

| Initial pre-set number | Initial pre-set value | Initial pre-set number | Initial pre-set value |
|---|---|---|---|
| (9) | (0001) | (C) | (0010) |
| (4) | (5500) | (6) | (5000) |
| (E) | (0002) | (0) | (0020) |
| (B) | (2A00) | (F) | (2001) |
| (7) | (0004) | (D) | (0040) |
| (A) | (5400) | (1) | (4002) |
| (3) | (0008) | (8) | (0080) |
| (2) | (2800) | (5) | (0005) |

The scrambled frames 30 generated by feedback shift register 28 are provided to an ECC block generator 32. In accordance with ECMA-267, ECC block generator 32 forms an ECC block 34 by arranging 16 consecutive scrambled frames in an array of 192 rows of 172 bytes each. To each of the 172 columns of bytes, 16 bytes of parity of outer code (PO) are added, thereby creating 16 new rows of parity bytes. To each of the resulting 208 rows (192 original rows plus 16 rows of parity bytes), 10 bytes of parity of inner code (PI) are added to form a complete ECC block 34 of 208 rows of 182 bytes each. The PO and PI bytes are calculated using Reed-Solomon encoding as described in ECMA-267, and will not be described further herein.

The resulting ECC block 34 is provided to an ECC block encoding system 36. In one embodiment, ECC block encoding system 36 includes an encoder 38 and an exclusive-OR gate 40. As in data frame encoding system 20, encoder 38 determines which bits of the ECC block 34 are to be inverted, and XOR gate 40 performs the inversions. In one example, ECC block encoding system 36 inverts all of the bits of all PO and PI bytes in the ECC block 34 to generate an encoded ECC block 42. This inversion will effectively disable the Reed-Solomon decoder in a conventional DVD player.

Although ECC block encoding system 36 is illustrated as a discrete functional block within DVD data encoding system 10, it will be understood that the functions of ECC block encoding system 36 may easily be integrated into another functional block within DVD data encoding system 10, such as ECC block generator 32.

As an alternative to the ECC block encoding scheme described above, ECC block generator 32 may be programmed to produce a non-standard ECC block 34. In a standard ECC block as described in ECMA-267, the PO bytes are generated using RS(208, 192, 17) Reed-Solomon encoding, while the PI bytes are generated using RS(182, 172, 11) Reed-Solomon encoding. Suitable alternative Reed-Solomon parameters may be chosen which will generate different parity bytes, thereby effectively disabling the Reed-Solomon decoder in a conventional DVD player.

The encoded ECC block 42 is provided to a recording frame generator 44. In accordance with ECMA-267, recording frame generator 44 generates 16 recording frames 46 from an ECC block 42 by interleaving one of the 16 PO rows at a time after every 12 rows of the ECC block. Each recording frame 46 therefore consists of an array of 13 rows of 182 bytes.

The recording frames 46 are provided to an eight-to-sixteen modulation (ESM) encoder 48, which converts each eight-bit byte of a recording frame into a corresponding run-length-limited (RLL) 16-channel bit code word. This conversion follows the procedure described in ECMA-267, in which the value of each eight-bit byte, together with the current conversion state, are used to determine both the 16-channel bit code word and the state for the next byte conversion.

In one embodiment, eight-to-sixteen modulator 48 may use conversion tables which are modified from those described in ECMA-267. For example, in Table G.1 of ECMA-267, the code words within each column (state) may be assigned to different eight-bit bytes. This scrambling of the conversion table will not interfere with the run-length-limiting aspects of the conversion so long as the association of "next state" values with their respective code words is maintained. Thus, the simplest method to derive an alternative conversion table is to reverse the order of the "8-bit bytes" listed in the first column of Table G.1 of ECMA-267 without changing any other value in any other column of the table. This scrambling will ensure that a conventional DVD player is unable to properly decode DVD 12.

The code words 50 generated by eight-to-sixteen modulator 48 are provided to a physical sector generator 52, which adds sync codes to the code words of a recording frame to generate a physical sector 54. This physical sector 54 may be structured in accordance with the specifications of ECMA-267. Alternatively, physical sector generator 52 may use a physical sector structure which is different from that described in ECMA-267. For example, an alternative physical sector structure is shown in Table B.

TABLE B

| SY4 | (1456 bits) | SY7 | (1456 bits) |
| SY3 | (1456 bits) | SY7 | (1456 bits) |
| SY2 | (1456 bits) | SY7 | (1456 bits) |
| SY1 | (1456 bits) | SY7 | (1456 bits) |
| SY4 | (1456 bits) | SY6 | (1456 bits) |
| SY3 | (1456 bits) | SY6 | (1456 bits) |
| SY2 | (1456 bits) | SY6 | (1456 bits) |
| SY1 | (1456 bits) | SY6 | (1456 bits) |
| SY4 | (1456 bits) | SY5 | (1456 bits) |
| SY3 | (1456 bits) | SY5 | (1456 bits) |
| SY2 | (1456 bits) | SY5 | (1456 bits) |
| SY1 | (1456 bits) | SY5 | (1456 bits) |
| SY0 | (1456 bits) | SY5 | (1456 bits) |

A physical sector consists of 13 rows, each comprising two sync frames. Each sync frame consists of a 32-bit sync code (SYx) as defined in ECMA-267 and 1456 channel bits representing one-half of a row of a recording frame. Accordingly, the first row of the recording frame is represented by th it row of the physical sector, the second by the second, and so on. In Table B, the order of the sync codes within the physical sector is vertically inverted from the order specified by ECMA-267. This will prevent a conventional DVD player from reading DVD 12. Of course, other permutations may also be used. Another alternative for creating a proprietary DVD format is to use the conventional order of sync codes within a physical sector, but alter one or more of the sync codes (e.g. SY0) to prevent a conventional DVD player from recognizing the physical sector.

The physical sector 54, whether of conventional or proprietary design, is provided to a non-return to zero inverted (NRZI) encoder 56. The resulting NRZI converted pulses 58 are recorded on DVD 12 using conventional techniques. The functions of physical sector generator 52 and NRZI encoder 56 are adequately described in ECMA-267, and will not be described further herein.

Figure 5:
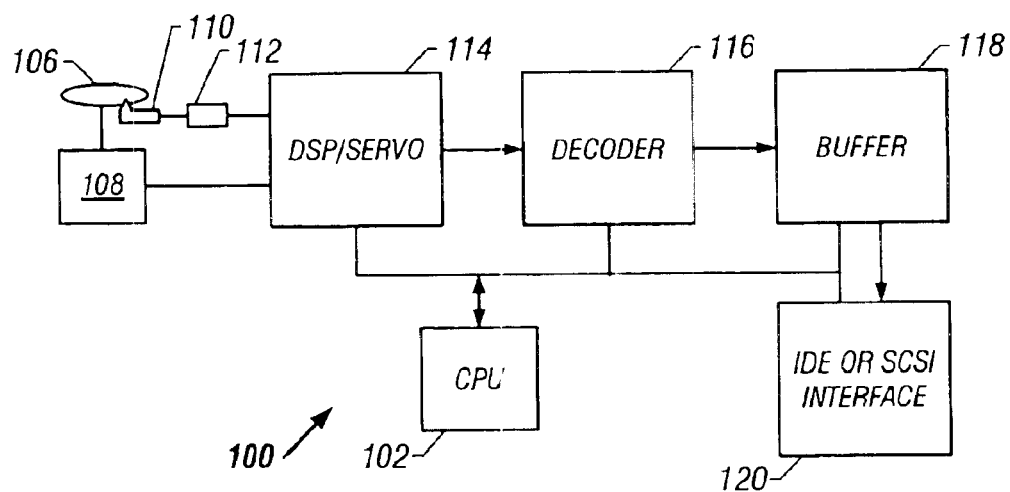
FIG. 5 is a partial block diagram of a personal computer system including a DVD drive.

Referring to FIG. 5, a partial block diagram of a DVD drive 100 is shown. DVD drive 100 may be a component of a personal computer system. DVD drive 100 is designed to read data from a DVD 106 which has a proprietary format resulting from one or more of the encoding schemes described above.

DVD drive 100 includes several standard components which will be described only briefly herein. DVD drive 100 includes a central processing unit (CPU) 102 for controlling the operation of DVD drive 100. DVD drive 100 also includes a conventional motor 108 for spinning DVD 106 at a controllable rate and a read/write head 110 for reading data from and writing data to DVD 106 (for purposes of illustration, only the read operation will be described herein). A read signal from read/write head 110 is amplified by a pre-amplifier 112.

A digital signal processor (DSP) and servo controller chip 114 controls the movement of motor 108 and read/write head 110, and also receives the read signal from pre-amplifier 112. The read signal is provided to a decoder 116 (described below), which decodes the Main Data stored on DVD 106. This data is passed on to a buffer 118 and th an IDE or SCSI interface 120. The data from DVD 106 may then be provided to other components of the personal computer system (not shown) for presentation to the user through one or more I/O devices such as a monitor and speakers (for audio/video data). The components of DVD drive 100 may be conventional in nature except for decoder 116.

Figure 6:
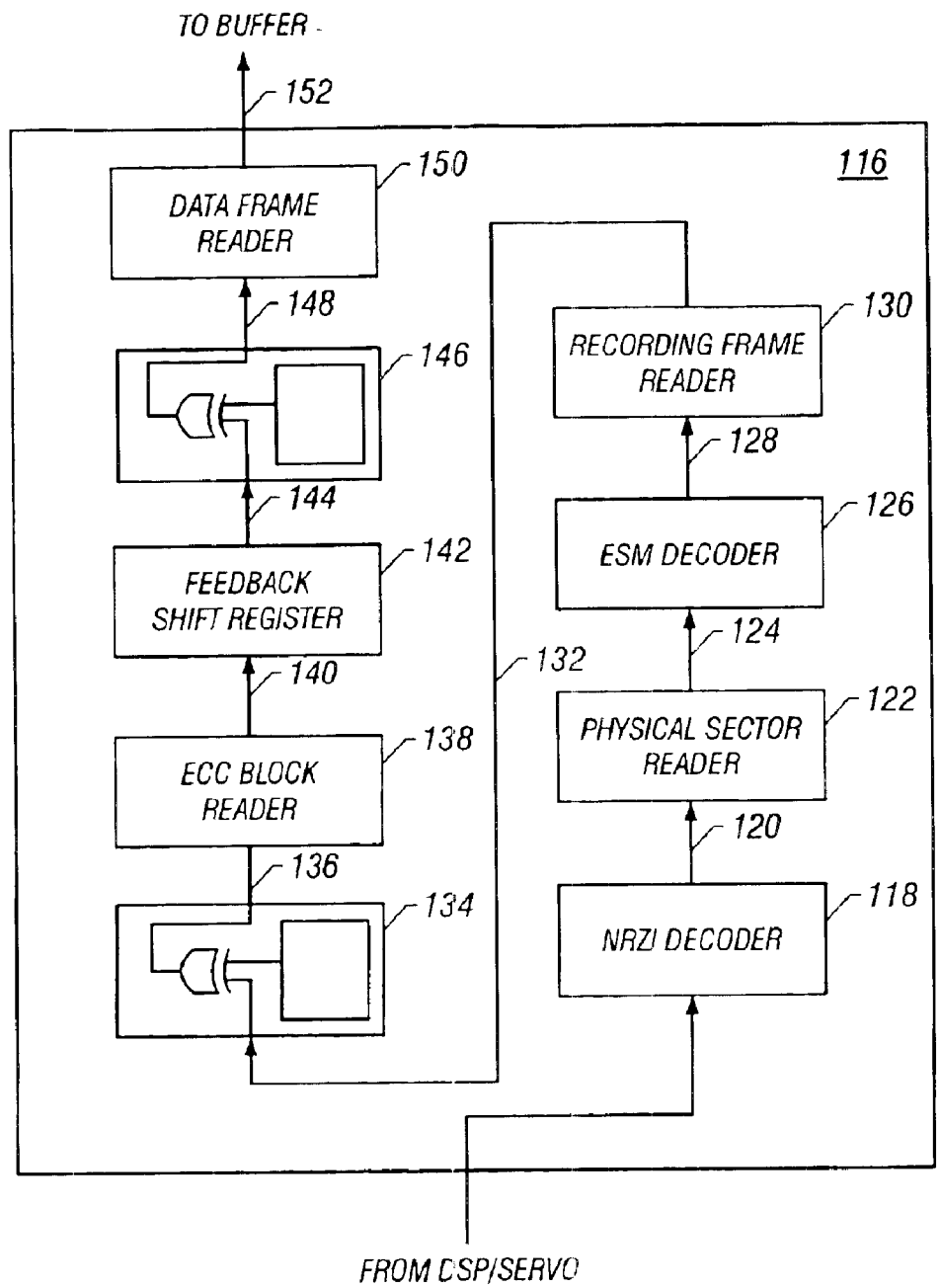
FIG. 6 is a block diagram of a decoder for use in the DVD drive.

A block diagram of decoder 116 is shown in FIG. 6. The read signal from DSP/servo controller 114 is received by an NRZI decoder 118, which may be of conventional design. The resulting data 120 in the form of channel bits arranged in physical sectors is provided to a physical sector reader 122, which may also be of conventional design. Physical sector reader 122 strips the sync codes from the ESM-encoded words of a recording frame, and passes the ESM-encoded words 124 to an ESM decoder 126. ESM decoder 126 uses the same conversion tables (whether conventional or modified) to decode the data as were used by ESM encoder 48 (shown in FIG. 1) during encoding.

The output from ESM decoder 126 is in the form of recording frames 128, which are received by a recording frame reader 130. Recording frame reader 130 de-interleaves the rows of the recording frames to regenerate ECC blocks 132. If an ECC block encoding system 36 (shown in FIG. 1) was used during data encoding, then an ECC block decoding system 134 may be used to decode the encoded ECC blocks 132 and generate decoded ECC blocks 136. The decoding system employed by ECC block decoding system 134 is simply the inverse of the encoding system used by ECC block encoding system 36. For example, ECC block decoding system 134 may re-invert all of the bits of all PO and PI bytes in the encoded ECC blocks 132 to generate the decoded ECC blocks 136.

The ECC blocks 136 are provided to an ECC block reader 138, which performs error checking and correction using the ECC data. ECC block reader regenerates scrambled data frames 140, which are then descrambled by a feedback shift register 142 to generate data frames 144. If a data frame encoding system 20 (shown in FIG. 1) was used during data encoding, then the encoded data frames 144 may be provided to a data frame decoder 146, which performs the decoding function corresponding to the encoding function performed by data frame encoding system 20. For example, data frame decoder 146 may re-invert the data frame bits inverted by data frame encoding system 20. The resulting data frames 148 are provided to a data frame reader 150, which extracts the Main Data 152 from the data frames 148 and passes the Main Data on to buffer 118 (shown in FIG. 5).

It will be appreciated that the encoding/decoding schemes described above provide methods for creating and reading proprietary format DVDs which may not be read or copied by conventional DVD players. The fact that these encoding/decoding schemes result from relatively minor modifications to existing DVD standards allows many standard system components to be used. The encoding/decoding schemes described herein are therefore relatively easy and inexpensive to implement.

Although the present invention and its advantages have been described in detail, it should be understood that various changes, substitutions, and alterations can be made therein without departing from the spirit and scope of the invention as defined by the appended claims.

I claim:

1. A method for reading and decoding data from an optical medium recorded according to a proprietary format based on a predetermined ECMA (European Computer Manufacturer's Association) standard, comprising:
   reading channel bits from the optical medium;
   removing sync codes from the channel bits to derive a plurality of ESM (eight-to-sixteen modulation)-encoded words;
   decoding the ESM-encoded words to generate a plurality of recording frames;
   rearranging the recording frames to generate an ECC (Error Correcting/Correction Code) block;
   removing parity bytes from the ECC block to generate a plurality or scrambled data frames;
   descrambling the scrambled data frames to generate a plurality of encoded data frames;
   inverting at least one selected bit at a predetermined location of each encoded data frame to generate a plurality of data frames, wherein only after inverting each data frame including the inverted bit has a correct or valid value according to the predetermined ECMA standard; and
   extracting main data from the plurality of data frames.

2. The method of claim 1, wherein inverting at least one selected bit of each encoded data frame to generate the data frames comprises inverting at least one selected bit of a sector number of each encoded data frame.

3. The method of claim 1, wherein inverting at least one selected bit of each encoded data frame to generate the data frames comprises inverting at least one selected bit of a sector information field of each encoded data frame.

4. The method of claim 1, wherein inverting at least one selected bit of each encoded data frame to generate the data frames comprises inverting at least one selected bit of an ID Error Detection Code field of each encoded data frame.

5. The method of claim 1, wherein inverting at least one selected bit of each encoded data frame to generate the data frames comprises inverting at least one selected bit of an Error Detection Code field of each encoded data frame.

6. The method of claim 1, wherein inverting at least one selected bit of each encoded data frame to generate the data frames comprises inverting at least one selected bit of a data field of each encoded data frame.

7. The method of claim 1, further comprising performing error checking and correction on the ECC block using the parity bytes prior to descrambling the scrambled data frames.

8. The method of claim 1, wherein reading the channel bits from the optical medium comprises:
   Deriving NRZI-encoded (Non-Return to Zero Inverted) pulses from the optical medium; and
   Decoding the NRZI-encoded pulses to generate the channel bits.

9. The method of claim 1, where prior to the inverting, the data has an incorrect or invalid value according to a predetermined ECMA standard.

10. The method of claim 1, wherein prior to the inverting, all of the read channel bits have a correct or valid value according to the predetermined ECMA standard.

11. A method for recording data on an optical medium according to a proprietary format based on a predetermined ECMA (European Computer Manufacturer's Association) standard, comprising:
   receiving main data;
   determining a plurality of data frame values in response to the main data;
   inverting at least one selected bit in a predetermined location at least one of the data frame values to generate a plurality of encoded data frames;
   scrambling the encoded data frames;
   generating ECC (Error Correcting/Correction Code) values in response to the scrambled data frames;
   adding the ECC values to the scrambled data frames to generate an ECC block;
   rearranging the ECC block to generate a plurality of recording frames;
   encoding the recording frames by an eight-to-sixteen modulation to generate code words;
   adding sync values to the code words to generate a plurality or physical sectors; and
   recording the physical sectors on the optical medium, wherein at least one of the recorded physical sectors including the inverted bit has an incorrect or invalid value according to the predetermined ECMA standard.

12. The method of claims 11, further comprising NRZI (Non-Return to Zero Inverted) encoding the physical sectors prior to recording the physical sectors on the optical medium.

13. The method of claim 11, wherein inverting at least one selected bit in at least one of the data frame values comprises inverting at least one selected bit of a sector number value.

14. The method of claim 11, wherein inverting at least one selected bit in at least one of the data frame values comprising inverting at least one selected bit of a sector information field.

15. The method of claim 11, wherein inverting at least one selected bit in at least one of the data frame values comprises inverting at least one selected bit of a ID Error Detection Code field.

16. The method of claim 11, wherein inverting at least one selected bit in at least one of the data frame values comprises inverting at least one selected bit of an Error Detection Code field.

17. The method of claim 11, wherein inverting at least one selected bit in at least one of the data frame values comprises inverting at least one selected bit of a data field.

18. A system for recording data on an optical medium according to a proprietary format based on a predetermined ECMA (European Computer Manufacturer's Association) standard, comprising:

an input terminal for receiving main data;

a framer having an input terminal coupled to the input terminal;

a data frame encoding system having an input terminal coupled to an output terminal of the data framer and adapted to invert at least one selected bit at a predetermined location in at least one of the data frames received from the framer;

a scrambler having an input terminal coupled to an output terminal of the encoding system;

an error correction code generator having an input terminal coupled to an output terminal of the scrambler;

an error correction code encoding system having an input terminal coupled to an output terminal of the error correction code generator;

a recording frame generator having an input terminal coupled to an output terminal of the error correction code encoding system;

an ESM (eight-to-sixteen modulation) encoder having its input terminal coupled to an output terminal of the recording frame generator;

a physical sector generator having an input terminal coupled to an output terminal of the ESM encoder; and a write head coupled to an output terminal of the physical sector generator, thereby to record on the optical medium, wherein at least one of the recorded physical sectors including the inverted bit has an incorrect or invalid value according to the predetermined ECMA standard.

19. A drive for reading and decoding data recorded according to a proprietary format based on a predetermined ECMA (European Computer Manufacturer's Association) standard from an optical medium, comprising:

a read head adapted to read data from the optical medium;

a physical sector reader coupled to the read head;

an ESM (eight-to-sixteen modulation) encoder coupled to an output terminal of the physical sector recorder;

a recording frame reader having an input terminal coupled to an output terminal of the ESM encoder;

a decoding system having an input terminal coupled to an output terminal of the recording frame reader and adopted to invert at least one selected bit at a predetermined location in at least one frame received from the recording frame reader, wherein only after the inversion the at least one frame has a correct or valid value according to the predetermined ECMA standard;

an error correction code reader having an input terminal coupled to an output terminal of the decoding system;

a descrambler having an input terminal coupled to an output terminal of the error correction code reader; and a data frame decoder having an input terminal coupled to an output terminal of the descrambler.

* * * * *

UNITED STATES PATENT AND TRADEMARK OFFICE
CERTIFICATE OF CORRECTION

PATENT NO. : 6,842,522 B1
DATED : January 11, 2005
INVENTOR(S) : Daniel Downing

It is certified that error appears in the above-identified patent and that said Letters Patent is hereby corrected as shown below:

Column 2,
Line 10, please replace "invention method" with -- invention, a method --.

Column 3,
Line 32, please replace "bo" with -- $b_0$ --.

Column 4,
Line 9, please replace "11111111111111111111111" with
-- 111111111111111111111111 --.
Line 10, please replace "the An alteration" with -- the alteration --.
Line 31, please replace "an" with -- and will --.

Column 7,
Line 58, please replace "th it" with -- the first --.

Column 8,
Line 29, please replace "th" with -- then to --.

Column 9,
Line 42, please replace "or" with -- of --.

Column 10,
Line 46, please replace "claims" with -- claim --.

Signed and Sealed this

Thirtieth Day of August, 2005

JON W. DUDAS
*Director of the United States Patent and Trademark Office*